(12) United States Patent
Okubo et al.

(10) Patent No.: US 10,221,944 B2
(45) Date of Patent: Mar. 5, 2019

(54) VEHICLE-MOUNTED CONTROL DEVICE OR VEHICLE-MOUNTED CONTROL SYSTEM

(71) Applicant: Hitachi Automotive Systems, Ltd., Hitachinaka-shi, Ibaraki (JP)

(72) Inventors: Satoru Okubo, Hitachinaka (JP); Kenji Masuda, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 105 days.

(21) Appl. No.: 15/319,025

(22) PCT Filed: Jun. 8, 2015

(86) PCT No.: PCT/JP2015/006643
§ 371 (c)(1),
(2) Date: Dec. 15, 2016

(87) PCT Pub. No.: WO2015/194407
PCT Pub. Date: Dec. 23, 2015

(65) Prior Publication Data
US 2017/0146118 A1 May 25, 2017

(30) Foreign Application Priority Data

Jun. 18, 2014 (JP) .................. 2014-124883

(51) Int. Cl.
*F16H 61/12* (2010.01)
*B60R 16/02* (2006.01)
(Continued)

(52) U.S. Cl.
CPC .............. *F16H 61/12* (2013.01); *B60R 16/02* (2013.01); *B60R 16/03* (2013.01); *F16H 61/0003* (2013.01); *F16H 2061/1292* (2013.01)

(58) Field of Classification Search
CPC ................... F16H 61/12; F16H 61/003; F16H 2061/1292; B60R 16/03
See application file for complete search history.

(56) References Cited

U.S. PATENT DOCUMENTS 8,786,424 B2 *  7/2014  Vilela .............. B60W 50/0205
                                                   340/501
9,218,236 B2 * 12/2015  Vilela ................. G06F 11/0739
(Continued)

FOREIGN PATENT DOCUMENTS

DE    10 2006 024 923 A1    12/2006
DE    11 2012 002 587 T5     4/2014
(Continued)

OTHER PUBLICATIONS

International Search Report (PCT/ISA/210) issued in PCT Application No. PCT/JP2015/066433 dated Aug. 11, 2015 with English-language translation (three (3) pages).
(Continued)

*Primary Examiner* — David J Hlavka
(74) *Attorney, Agent, or Firm* — Crowell & Moring LLP

(57) ABSTRACT

Provided is a power supply breaker circuit diagnosing technique capable of accurately detecting functional failure of a power supply relay of an electronic control device for a vehicular automatic transmission, and capable of reliable transition to a fail-safe state, without requiring a change in the internal configuration of the current electronic control device, and with a minimum of system modification. By utilizing a network communication channel such as a CAN implemented on an electronic control device (ATCU) for a vehicular automatic transmission, and using another electronic control device as an ATCU monitor device, the other electronic control device which is on the monitoring side controls a breaker circuit of the ATCU. The other electronic control device on the monitoring side breaks the breaker circuit of the ATCU for a certain period, and makes a diagnosis by detecting communication loss from the ATCU.

1 Claim, 8 Drawing Sheets

(51) Int. Cl.
  *B60R 16/03* (2006.01)
  *F16H 61/00* (2006.01)

(56) References Cited

U.S. PATENT DOCUMENTS

| | | | | |
|---|---|---|---|---|
| 2006/0276947 | A1* | 12/2006 | Kaita | H01H 47/002 701/48 |
| 2008/0238192 | A1 | 10/2008 | Hashimoto et al. | |
| 2013/0253786 | A1* | 9/2013 | Saito | F16H 61/12 701/55 |
| 2013/0267381 | A1* | 10/2013 | Saito | F16H 61/12 477/79 |
| 2014/0121901 | A1 | 5/2014 | Shii | |

FOREIGN PATENT DOCUMENTS

| | | |
|---|---|---|
| JP | 6-351077 A | 12/1994 |
| JP | 2006-335183 A | 12/2006 |
| JP | 2008-88885 A | 4/2008 |
| JP | 2008-240684 A | 10/2008 |
| JP | 2009-196453 A | 9/2009 |
| JP | 2012-107655 A | 6/2012 |
| JP | 2013-6454 A | 1/2013 |
| JP | 2013-24266 A | 2/2013 |
| JP | 2014-91340 A | 5/2014 |
| WO | WO 2008/015537 A2 | 2/2008 |

OTHER PUBLICATIONS

Japanese-language Written Opinion (PCT/ISA/237) issued in PCT Application No. PCT/JP2015/066433 dated Aug. 11, 2015 (four (4) pages).
Japanese-language Office Action issued in counterpart Japanese Application No. 2016-529248 dated Nov. 21, 2017 with English translation (six (6) pages).
Extended European Search Report issued in counterpart European Application No. 15809855.8 dated Jan. 22, 2018 (eight pages).

* cited by examiner

VEHICLE-MOUNTED CONTROL DEVICE OR VEHICLE-MOUNTED CONTROL SYSTEM

TECHNICAL FIELD

The present invention relates to a vehicle-mounted electronic control device.

BACKGROUND ART

Due to the accelerated trend in electronic control of a vehicle control device, multiple electronic control devices are mounted on each vehicle in recent years (refer to PTL 1 and the like). Each of these electronic control devices is supplied with driving power from a power supply such as a battery. Also, between the power supply and the electronic control device, a power supply relay is normally inserted as a means for supplying/breaking the driving power. Also, in a target device to be controlled by the electronic control device, a power supply relay or a circuit for supplying/breaking the power is generally inserted.

Each of the electronic control devices needs to perform control to guide a corresponding system to a safe direction in a case in which any abnormality occurs. Generally disclosed is a technique in which the electronic control device detects the abnormality by means of a monitor microcomputer or a main microcomputer of its own and breaks the power supply relay of the target device or the power supply circuit to move to a fail-safe state.

For example, in an electronic control device for an engine, a main microcomputer for throttle control, ignition control, and fuel injection control makes a self-diagnosis in terms of an input function, an operation function, an output function, and a storage function to confirm whether or not the main microcomputer itself is normal. The electronic control device has also implemented therein a monitor device such as a sub-microcomputer to monitor a functional failure of the main microcomputer. In a case in which the sub-microcomputer detects a failure, the sub-microcomputer breaks a power supply relay of an electronic throttle valve that the electronic control device is controlling and physically breaks an output unit of a fuel injection valve.

With such a configuration, even with no guarantee of bringing the target device to the fail-safe state due to the abnormality of the main microcomputer, the target device can reliably be brought to the fail-safe state by the monitor device such as the sub-microcomputer. Such a technique is known.

Also known is a technique in which an electronic control device is provided that collectively controls power supply relays connected to a plurality of electronic control devices respectively fulfilling predetermined functions and connected through a LAN and detects whether or not a communication state is present depending on the state of each of the power supply relays to determine whether or not the power supply relay is failed (refer to PTL 2 and the like).

CITATION LIST

Patent Literature

PTL 1: JP 2009-196453 A
PTL 2: JP 2008-88885 A

SUMMARY OF INVENTION

Technical Problem

However, in the method proposed in PTL 1, the electronic control device must have implemented therein the monitor device such as the sub-microcomputer Additional implementation will lead to a cost increase of the electronic control device.

Also, in a case in which no monitor device is implemented on the electronic control device, a functional failure can be detected by a self-diagnosis. However, depending on the failed part (the operation unit or the output unit, for example) in the microcomputer, transition to the fail-safe state cannot be achieved.

There is also a case in which the monitor device cannot be implemented due to a hardware limitation such as an implementation area of the electronic control device. In this case as well, a functional failure can be detected by a self-diagnosis, but, depending on the failed part, reliable transition to the fail-safe state is not guaranteed.

PTL 2 employs a method in which a failure is detected by means of communication with a vehicle-mounted electronic device connected to a power supply via a different relay from a relay targeted for failure detection. Thus, not only an electronic control device whose target relay is connected to a monitor device but also an electronic control device connected to another power supply relay for comparison are required, and total system cost will increase.

PTL 2 also focuses on a method for detecting an abnormality and does not describe a behavior (fail-safe process) after abnormal detection as a system.

The present invention is accomplished by taking such problems as mentioned above into consideration thereof, and an object thereof is to provide a technique for detecting a failure of a power supply breaker circuit of an electronic control device for a vehicular automatic transmission and, in a case in which an upper electronic control device performs abnormality detection and detects an abnormality, safely moving to a fail-safe state without depending on the electronic control device for the vehicular automatic transmission.

Solution to Problem

To attain the above object, the present invention has solutions described below.

A monitor system for monitoring an electronic control device for a vehicular automatic transmission (hereinbelow, an ATCU) according to an aspect of the present invention includes an upper electronic control device (hereinbelow, a monitor device) physically independent, for detecting an abnormality of the ATCU, a power supply means for supplying the ATCU and the monitor device with driving power, a power supply means for supplying the monitor device with driving power in a case in which an activation switch signal (hereinbelow, an IGNSW) to be input from outside is in an active level, a first relay (hereinbelow, an IGN relay) provided between the power supply means and the monitor device for supplying/breaking power to the monitor device, a second relay (hereinbelow, an ATCU relay) provided on the downstream of the IGN relay for supplying/breaking driving power to the ATCU based on determination of the monitor device regarding whether or not the driving power is to be supplied to the ATCU, and a communication line for making a diagnosis in the ATCU and the monitor device. The monitor device turns ON/OFF the ATCU relay at specific time and confirms communication loss from the ATCU at the equal time to detect a failure of the ATCU relay.

In the monitor device according to another aspect, in a case in which the IGNSW changes from a low level to an active level, the monitor device makes a diagnosis of a failure of the ATCU relay before normal control is performed.

The monitor device according to another aspect makes a self-diagnosis of a microcomputer thereof in a case in which the IGNSW changes from a low level to an active level, and only when a diagnosis result is normal, the monitor device turns ON the ATCU relay to supply the ATCU with electric power.

The ATCU according to another aspect is activated and then makes a self-diagnosis of a microcomputer thereof, and only when a diagnosis result is normal, the ATCU transmits a breaker circuit diagnosis request to the upper electronic control device by means of the communication line.

In the monitor device according to another aspect, in a case in which the monitor device has received the breaker circuit diagnosis request from the ATCU by means of the communication line, the monitor device causes the ATCU relay to be turned OFF to break electric connection to the ATCU.

In the ATCU according to another aspect, the ATCU, electric connection to which is broken, detects communication loss with the monitor device by means of the communication line.

In the monitor device according to another aspect, in a case in which the monitor device detects the communication loss, the monitor device determines the power supply breaker circuit diagnosis of the ATCU is normal. Conversely, in a case in which communication with the ATCU is established although the ATCU relay is caused to be turned OFF, the monitor device determines the power supply breaker circuit diagnosis is abnormal.

In the ATCU according to another aspect, in a case in which the ATCU has received information of the power supply breaker circuit diagnosis abnormality from the monitor device by means of the communication line, the ATCU moves to a fail-safe state such as a standby state not to perform control of the vehicular automatic transmission, that is, oil pressure control of a solenoid valve.

Advantageous Effects of Invention

According to the present invention, by utilizing a network communication channel such as a CAN implemented on any of most recent electronic control devices as well as on an electronic control device for a vehicular automatic transmission (ATCU), another electronic control device can be regarded as a monitor device of the ATCU, and the monitoring-side other electronic control device controls a power supply relay of the ATCU.

With the above system configuration, the monitor device turns OFF the ATCU relay at intended time and confirms a communication state from the ATCU through this operation to enable an ON/OFF failure of the ATCU relay to be detected.

Also, in a case in which the monitor device detects an abnormality of the ATCU, the monitor device can turn OFF the power supply relay of the ATCU to stop operations of the ATCU. As a result, it is possible to prevent enormous damage, such as an interlock caused by being unable to turn OFF the power supply relay due to runaway of the ATCU, from being generated.

Also, in a case in which the ATCU relay is fixed to an ON state, the monitor device transmits failure information to the ATCU, and the ATCU can carry out a fail-safe process such as transition to a standby state by the ATCU itself.

Thus, another electronic control device implemented on the vehicle acts as a monitor device to dispense with implementation of a monitor device on the ATCU itself, which is advantageous to system cost reduction.

DESCRIPTION OF EMBODIMENTS

Hereinbelow, embodiments of the present invention will be described with reference to the drawings.

First Embodiment

A first embodiment of the present invention will be described with reference to FIGS. 1 to 3.

Figure 1:
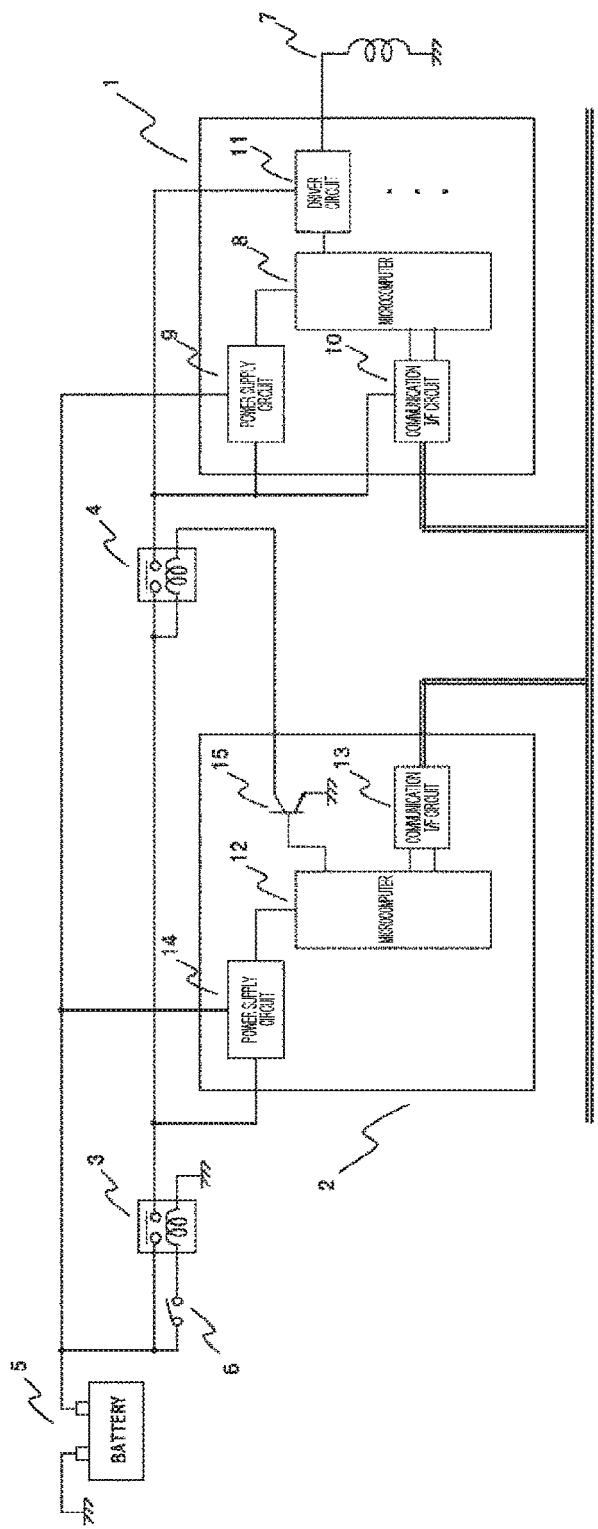
FIG. 1 illustrates an example of a monitor system as an embodiment of the present invention.
Figure 2:
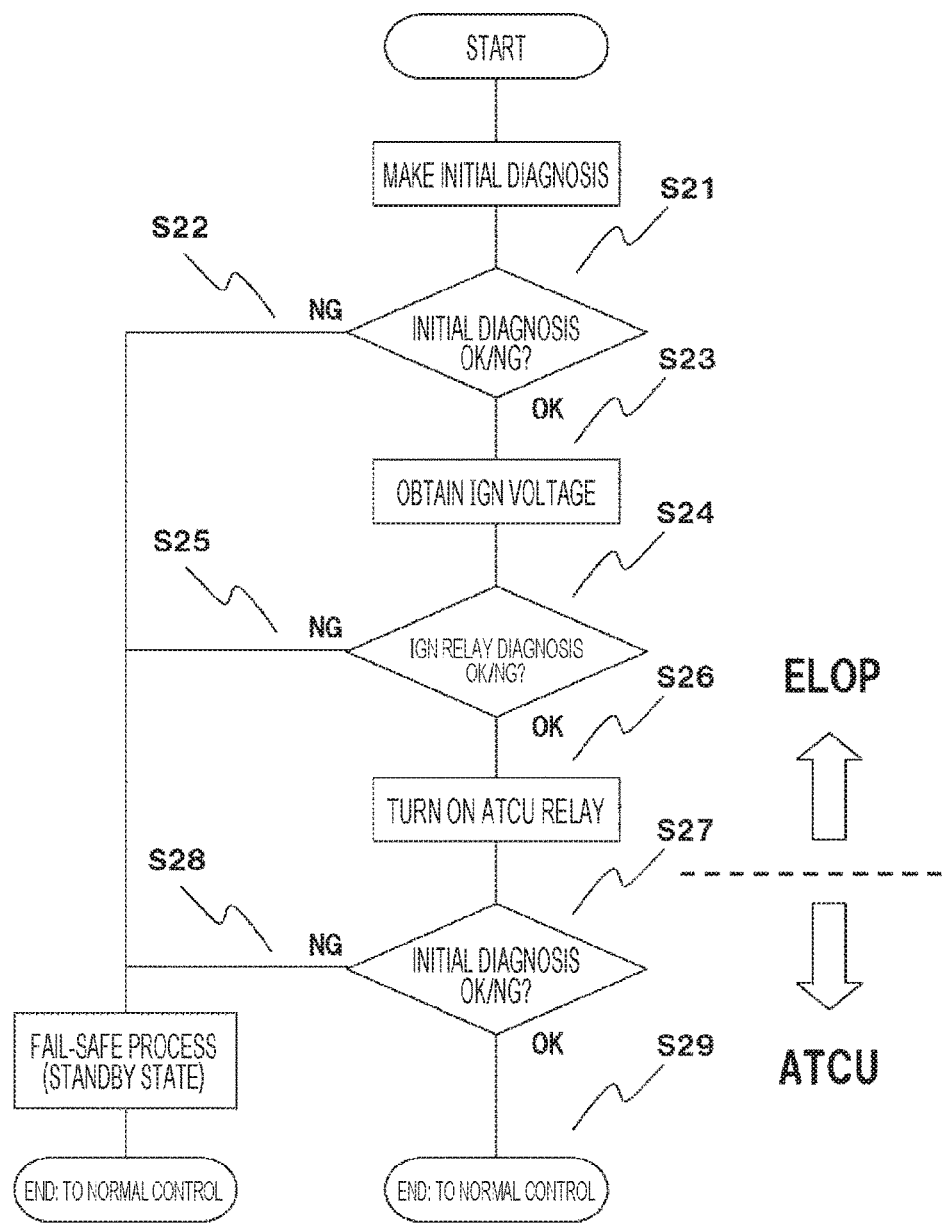
FIG. 2 is a flowchart illustrating a monitoring procedure between an ELOP and an ATCU at the time of first activation.

FIG. 1 illustrates the first embodiment of the present invention in which a transmission control device (hereinbelow referred to as an ATCU) 1 for controlling a vehicular automatic transmission is a target to be monitored. The target to be monitored may be an electronic control device for controlling another vehicle-mounted electric component such as an engine, a seat belt, and a motor.

FIG. 1 is a schematic view of a monitor system for monitoring the ATCU 1 in which an electric oil pump control device (hereinbelow referred to as an ELOP) 2 is a monitor device. The monitor system includes the ATCU 1, which is a target to be monitored, the ELOP 2, which is physically independent from the ATCU 1 and which acts as a monitoring side, an IGN relay 3 for supplying/breaking driving power to the ELOP 2, an ATCU relay 4 for undergoing ON/OFF control by means of the ELOP 2 and supplying/breaking driving power to the ATCU 1, a power supply (may be a battery or a not-illustrated power generator) 5 for supplying driving power to respective electronic control devices, an IGNSW 6 for undergoing ON/OFF operations of a driver and controlling whether or not driving power is supplied to the ELOP 2 and the respective electronic control devices, and a solenoid valve 7 for connecting/disconnecting a crutch of the automatic transmission in response to an instruction from the ATCU 1. The ATCU relay 1 has only to have a switch function to enable supply/break of current. The ATCU relay 4 may be a mechanical relay turned ON/OFF by contact shift or a semiconductor relay using a semiconductor switching element.

The ATCU 1 includes a microcomputer 8 serving as a control circuit for switching calculation and output of the driving amount of and to one of a plurality of solenoid valves 7 to calculation and output of the driving amount of and to another one, a power supply circuit 9 for converting supply voltage from the power supply 5 into driving voltage and supplying the driving voltage to the microcomputer 8, a communication I/F circuit 10 for communicating with the ELOP 2, and a driver circuit 11 for converting the driving amount to the solenoid valve 7 calculated in the microcomputer 8 into voltage.

The ELOP 2 includes a microcomputer 12 serving as a control circuit for calculating and outputting the driving amount to an oil pump for pressurizing operating oil of the automatic transmission, a power supply circuit 14 for converting supply voltage from the power supply 5 into driving voltage and supplying the driving voltage to the microcomputer 12, a communication I/F circuit 13 for communicating with the ATCU 1, and an ATCU relay control circuit 15 for turning ON/OFF the ATCU relay 4 to control electric power to be supplied to the ATCU 1, which is an external electronic control device. As the ATCU relay control circuit 15, a transistor is illustrated in FIG. 1. In a case in which voltage to be output from the microcomputer 12 is sufficient to drive the ATCU relay 4, or in a case in which a transistor is provided outside the ELOP 2, the ATCU relay control circuit 15 does not need to be a transistor inside the ELOP 2. In this case, an output signal line adapted to cause the microcomputer 12 to drive the ATCU relay 4 functions as the ATCU relay control circuit 15.

The communication I/F circuit 10 and the driver circuit. 11 implemented on the ATCU 1 are directly connected to the ATCU relay 4. Also, the microcomputer 8 is also provided on the downstream side of the ATCU relay 4 via the power supply circuit 9.

To the power supply circuit 9, a path through which electric power is supplied from the power supply 5 not via the IGN relay 3 or the ATCU relay 4 and a path through which electric power is supplied from the power supply 5 via the IGN relay 3 and the ATOP relay 4 are respectively connected. Through the path provided with the various relays, electric power is supplied to the power supply circuit 9 when the IGNSW 6 is turned ON by the driver to cause the IGN relay 3 to be turned ON, and the ATCU relay 4 is turned on by the ELOP 2. The power supply circuit 9 thereafter supplies an electronic part such as the microcomputer 8 with predetermined driving voltage. The microcomputer 8 receives the driving voltage from the power supply circuit 9, performs a predetermined reset process, and starts control of the solenoid valve 7.

When the IGNSW 6 is turned OFF by the driver, the IGN relay 3 is turned OFF, and power supply to the power supply circuit 9 through the path provided with the various relays is broken. The power supply circuit 9 moves to a self shut-off period through a predetermined self shut-off delay period. The power supply circuit 9 supplies driving voltage to the microcomputer 8 until an instruction from the microcomputer 8 is provided with use of voltage to be supplied from the power supply 5 not via the various relays. The microcomputer 8 performs processes such as storage of various learned values during the self shut-off period and instructs the power supply circuit 9 to stop supply of the driving voltage to end the self shut-off period.

Here, the self shut-off delay period is a period of a system standby state, and the ATCU 1 is in a non-operated state during the period.

Meanwhile, to the power supply circuit 14, the two kinds of power supply paths are connected in a similar manner.

In the monitor system in FIG. 1 described above, abnormality detection of the ATCU 1 is performed at the time of system activation and at the time of a regular process, and when any abnormality occurs, the monitor device turns OFF the ATCU relay 4 as a fail-safe process.

FIG. 9 is a schematic view of a conventional system. Unlike FIG. 1, the conventional system does not include the ATCU relay 4, the ATCU relay control circuit 15, and peripheral circuits thereof.

Hereinbelow, a process flow of detecting an abnormality of the ATCU 1 according to the present embodiment will be described. FIG. 2 illustrates a process flow of the ATCU 1 and the ELOP 2 at the time of system activation.

First, when the IGNSW 6 is turned ON, the IGN relay 3 is turned ON, electric power is supplied to the power supply circuit 14 of the ELOP 2, and the microcomputer 12 is activated.

Subsequently, the activated microcomputer 12 makes a self-diagnosis to determine whether or not an internal function has a failure (S21). Specific contents of this diagnosis are a ROM/RAM diagnosis, a register diagnosis, and the like.

In a case in which the diagnosis result is NG, transition to the fail-safe state is carried out (S22). In a case in which the diagnosis result is OK, the microcomputer 12 obtains a voltage state of the IGNSW 6 (S23).

Subsequently, in a case in which the obtained voltage of the IGNSW 6 is 0 V (OFF state), and in which the ELOP 6 is activated, it is determined that the IGN relay 3 is failed in terms of the ON operation (S24), and transition to the fail-safe state is carried out (S25) since, in this case, power is not supposed to be supplied to the ELOP 2.

In a case in which the diagnosis result is OK, the ATCU relay 4 is turned ON to activate the ATCU 1 (S26).

After activation of the ATCU 1, the ATCU 1 makes a self-diagnosis to determine whether or not an internal function of the microcomputer 8 has a failure (S27). Specific contents of this diagnosis are a ROM/RAM diagnosis, a register diagnosis, and the like.

In a case in which the diagnosis result is NG, transition to the fail-safe state is carried out (S28). In a case in which the diagnosis result is OK, the ATCU monitor system is determined to be normal, and transition to normal control is carried out (S29).

Meanwhile, the fail-safe control in this flowchart is to take control so that transition to a standby state and a reprogramming wait state may be carried out by the microcomputer 12 itself, and so that no operations may be performed until the IGNSW 6 is turned OFF.

Figure 3:
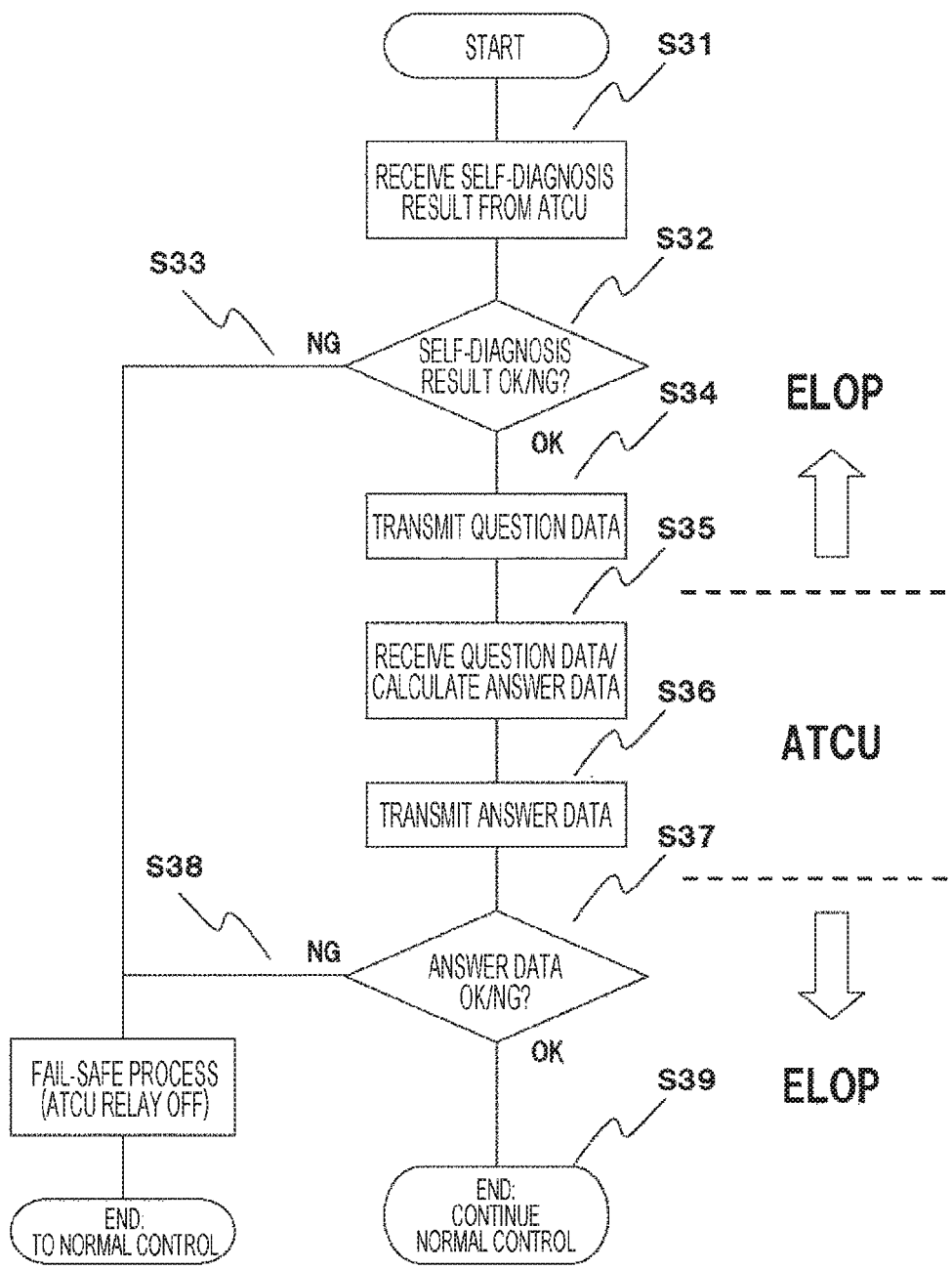
FIG. 3 is a flowchart illustrating a monitoring procedure between the ELOP and the ATCU at the time of a normal operation.

FIG. 3 illustrates a process flow of the ATCU 1 and the ELOP 2 at the time of normal control after system activation.

The ELOP 2 receives the self-diagnosis result of the ATCU 1 from the ATCU 1 with use of a communication means (a CAN communication using the communication I/F circuits 10 and 13 in this example) (S31). Specific contents of this self-diagnosis are not only functional diagnoses inside the microcomputer such as a ROM/RAM 4 diagnosis and a register diagnosis but also functional diagnoses of the ATCU 1 as a main body. This self-diagnosis is a diagnosis made by the ATCU 1 itself.

The ELOP 2 makes an OK/NG determination based on the self-diagnosis result from the ATCU 1 (S32). In a case in which the diagnosis result is NG, the ELOP 2 moves to fail-safe control. The ELOP 2 turns OFF the ATCU relay 4 to break electric connection to the ATCU 1 (S33). In this case, since the ATCU 1 recognizes the abnormal state of its own, wiring may be performed so that not the ELOP 2 but the ATCU 1 itself can turn the ATCU relay 4 OFF.

In a case in which the diagnosis result in S32 is OK, the ELOP 2 transmits question data for detecting a functional failure of the microcomputer of the ATCU 1, more specifically, a failure of an operator of the microcomputer, to the ATCU 1 by means of the CAN communication (S34).

The ATCU 1 generates answer data with use of the operator of the microcomputer 8 based on the question data received from the ELOP 2 (S35) and transmits the answer data back to the ELOP 2 (S36).

The ELOP 2 makes an OK/NG determination based on the answer data received from the ATCU 1 (S37). In a case in which the diagnosis result is NG, the ELOP 2 moves to fail-safe control. The ELOP 2 turns OFF the ATCU relay 4 to break electric connection to the ATCU 1 (S38).

In a case in which the diagnosis result is OK, the ELOP 2 determines that the ATCU 1 is normal and continues normal control (S39). Due to the above diagnoses, the ELOP 2 can diagnose an abnormal state that the ATCU 1 itself cannot determine.

Although an example in which the ELOP 2 monitors the ATCU 1 through transmission/reception of the question data and the answer data has been described in this flowchart, as another monitor method, a watchdog timer method may be employed, in which the ELOP 2 monitors a signal periodically transmitted from the ATCU 1 via the CAN communication.

Meanwhile, the fail-safe control in this flowchart is control in which the microcomputer 12 of the ELOP 2 operates the ATCU relay control circuit 15 to turn OFF the ATCU relay 4.

By making the above diagnoses, even in a case in which no monitor device is implemented on the ATCU 1, an electronic control device connected to the ATCU 1 via the network functions as a monitor device to enable a failure and a functional failure of the microcomputer or the like of the ATCU 1 to be detected. That is, it is possible to provide the monitor system capable of accurately detecting a failure of an electronic control device and capable of reliable transition to the fail-safe state without requiring a change in the internal configuration of the current electronic control device and with a minimum of system modification.

Also, with the system configuration according to the present invention, even in a case in which the system power supply cannot be stopped even when the ATCU relay 4 is turned OFF due to runaway of the microcomputer of the ATCU 1, the functions of the ATCU 1, that is, operations of the solenoid valve 7 and network communication, can be stopped by turning OFF the ATCU relay 4 on the side of the ELOP 2 serving as a monitor device. As a result, since the vehicle travels with the automatic transmission being in a direct gear state, it is possible to prevent enormous damage, such as an interlock caused by being unable to turn OFF the power supply relay due to runaway of the ATCU 1, from being generated.

Also, another electronic control device implemented on the vehicle acts as a monitor device to dispense with implementation of a monitor device on the ATCU 1 itself, which is advantageous to system cost reduction. Further, in a case in which the ATCU 1 is implemented integrally with the automatic transmission, there are limitations to the size and the implementation area of the ATCU. According to the present invention, such limitations can be satisfied.

Although the configuration of the above embodiment according to the present invention has been described, the present invention is not limited to the monitor system of the ATCU and can be applied to an electronic control device having a function of bringing a vehicle in a safe direction by causing operations of the electronic control device to be stopped.

Second Embodiment

Figure 4:
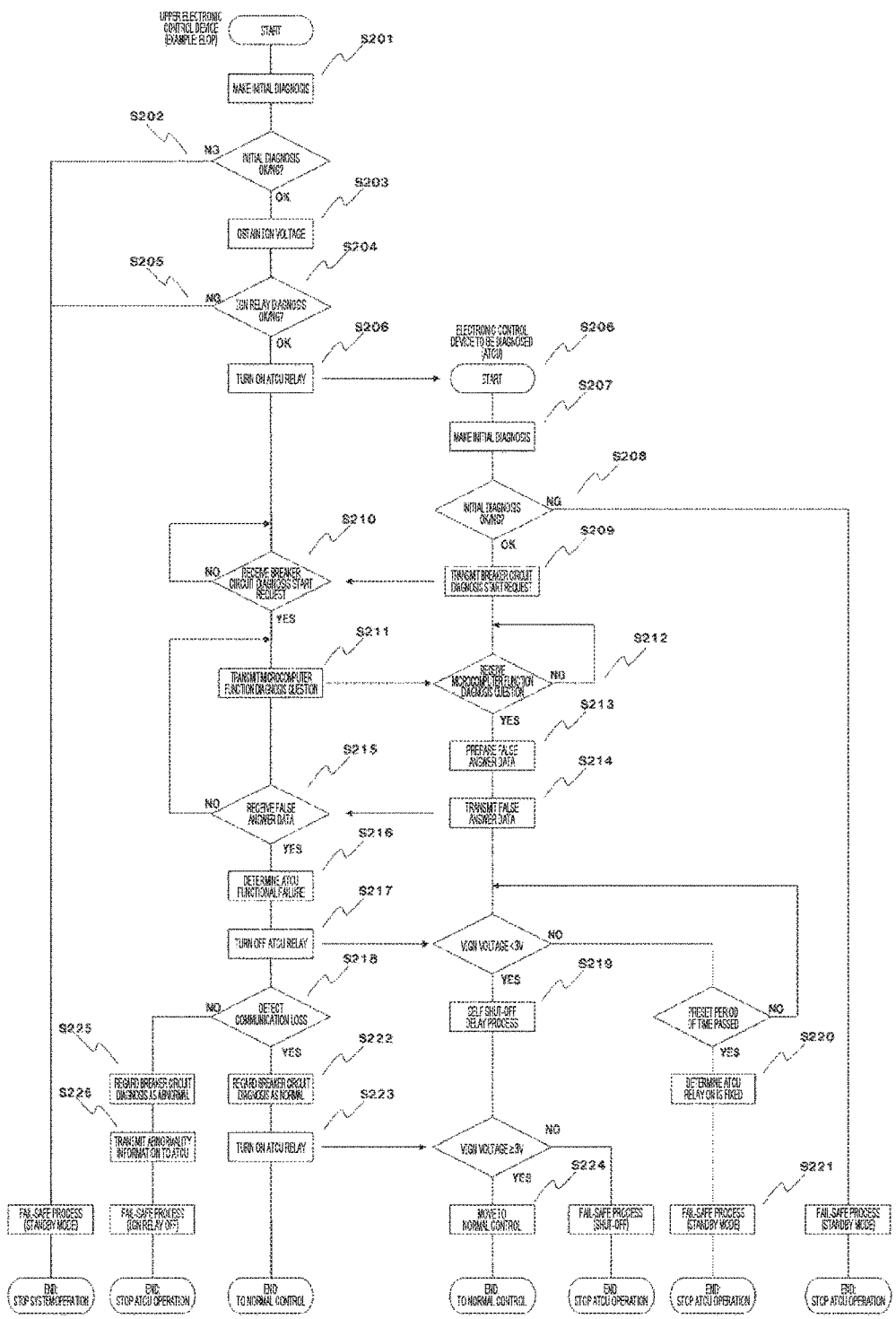
FIG. 4 illustrates a power supply breaker circuit diagnosis procedure.
Figure 5:
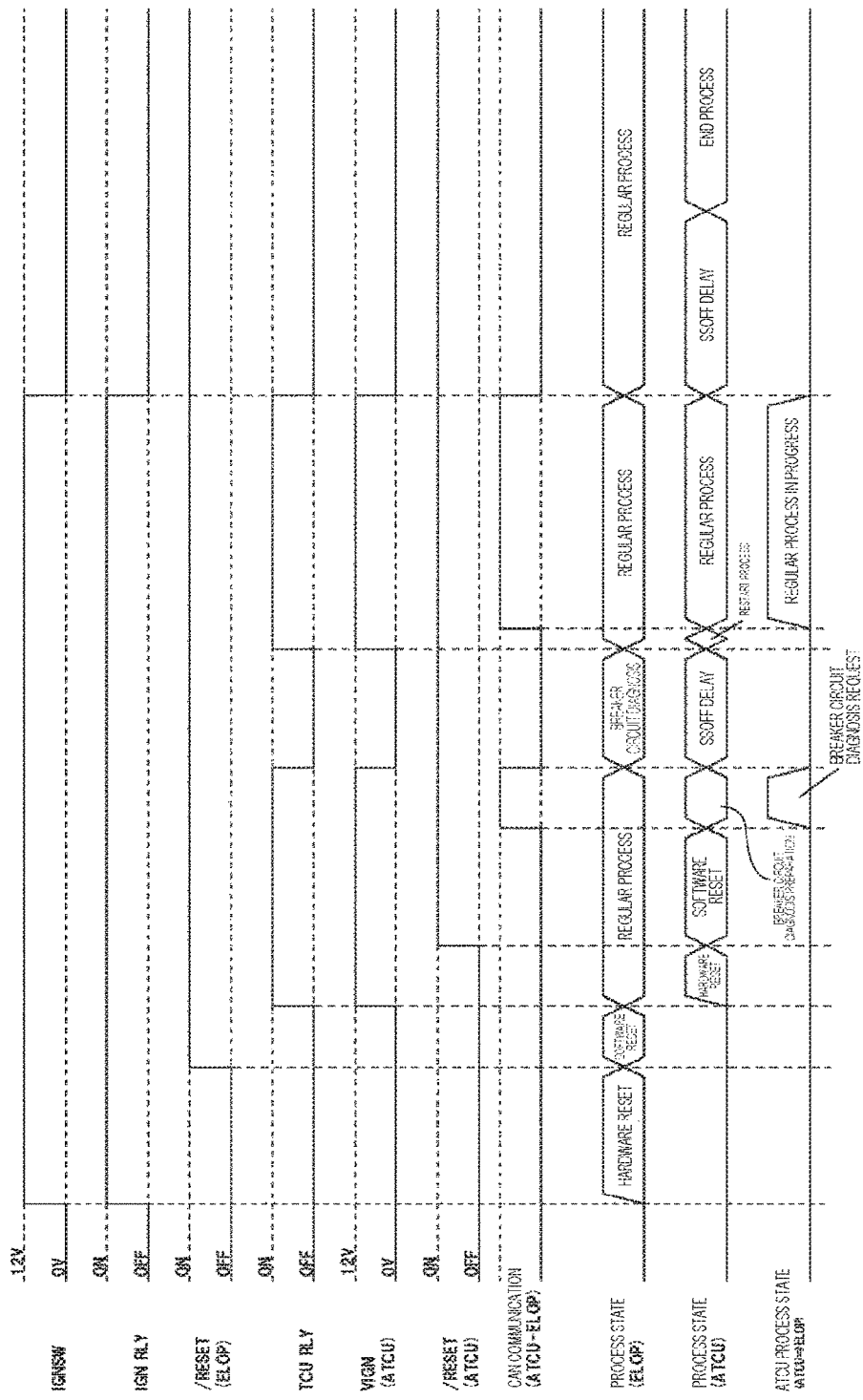
FIG. 5 is a timing chart of the power supply breaker circuit diagnosis at the time of the normal operation (first activation).

Hereinbelow, a second embodiment will be described with reference to FIGS. 4 and 5. In the present embodiment, a power supply breaker circuit diagnosing technique by means of a monitor device will be described. Similarly to the first embodiment, the system configuration described in FIG. 1 is available, and description of the system configuration is thus omitted.

First, when the IGNSW 6 is turned ON, the IGN relay 3 is turned ON, electric power is supplied to the power supply circuit 14 of the ELOP 2, and the microcomputer 12 is activated.

Subsequently, the activated microcomputer 12 makes a self-diagnosis to determine whether or not an internal function has a failure (S201). Specific contents of this diagnosis are a ROM/RAM diagnosis, a register diagnosis, and the like. In a case in which the diagnosis result is NG, transition to the fail-safe state is carried out (S202). In a case in which the diagnosis result is OK, the microcomputer 12 obtains a voltage state of the IGNSW 6 (S203).

Subsequently, in a case in which the obtained voltage of the IGNSW 6 is 0 V (OFF state), and in which the ELOP 6 is activated, it is determined that the IGN relay 3 is failed in terms of the ON operation (S204), and transition to the fail-safe state s carried out (S205) since, in this case, power is not supposed to be supplied to the ELOP 2.

Meanwhile, the fail-safe control in this step is to take control so that transition to a standby state and a reprogramming wait state may be carried out by the microcomputer 12 itself, and so that no operations may be performed until the IGNSW 6 is turned OFF.

In a case in which the diagnosis result is OK, the ATCU relay 1 is turned ON to activate the ATCU 1 (S206).

After activation of the ATCU 1, the ATCU 1 makes a self-diagnosis to determine whether or not an internal function of the microcomputer 8 has a failure (S207). Specific contents of this diagnosis are a ROM/RAM diagnosis, a register diagnosis, and the like. In a case in which the diagnosis result is NG, transition to the fail-safe state is carried out (S208). In a case in which the diagnosis result is OK, the ATCU system is determined to be normal, and transition to a breaker circuit diagnosis of the ATCU relay 1 is carried out.

Subsequently, the ATCU 1 transmits a breaker circuit diagnosis start request to the ELOP 2 (S209). In a case in which the ELOP 2 has received the breaker circuit diagnosis start request from the ATCU 1 (S210), the ELOP 2 transmits a question for diagnosing a microcomputer function of the ATCU 1 (S211). At this time, the ELOP 2 sets an error counter that is to be counted up each time a false answer is received from the ATCU 4 to a threshold value at which an abnormality will be determined when one more false answer is received.

The ATCU 1 receives the question from the ELOP 2 (S212) and calculates this question in the microcomputer 8 to prepare an answer. Here, the ATCU 1 prepares a false answer on purpose (S213). After the ATCU 1 prepares the false answer, the ATCU 1 transmits the false answer to the ELOP 2 (S214).

The ELOP 2 that has received the false answer (S215) counts up the error counter to cause an abnormality to be determined, determines that the ATCU 1 has a functional failure (S216), and breaks (OFF) the ATCU relay 4 as the fail-safe operation (S217).

Figure 8:
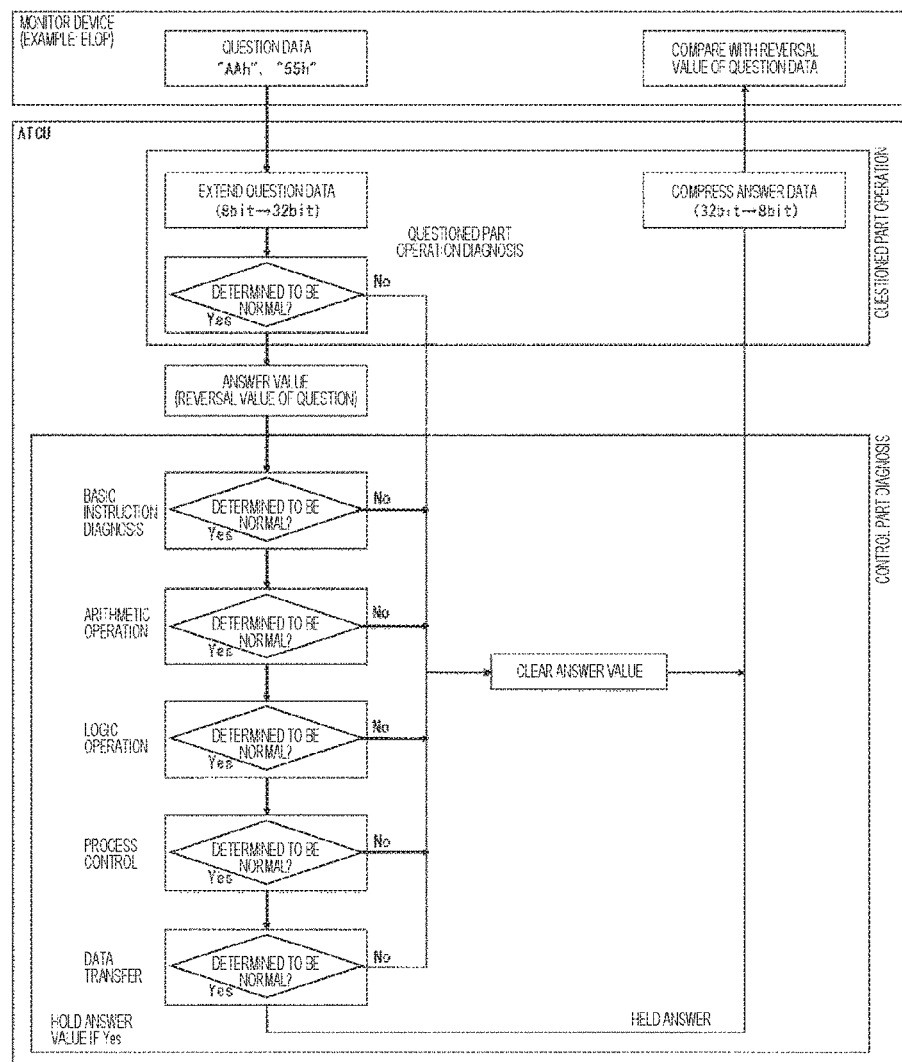
FIG. 8 is a flowchart illustrating a procedure for calculating answer data in the ATCU to question data from the ELOP.

Here, an example of a method for preparing a question for diagnosing a microcomputer function of the ATCU 1 is illustrated in FIG. 8.

A question received from the ELOP is subject to a questioned part diagnosis and a control part diagnosis to cause answer data to be generated.

Specifically, question data from the ELOP is first extended from 8 bit to 32 bit, and a self-diagnosis is made to determine whether the question data is normally extended.

Subsequently, extended data is bit-reversed. Based on the data, as the control part diagnosis, a basic instruction diagnosis, an arithmetic operation, a logic operation, process control, and data transfer are executed in this order, and a set of commands used in the operator of the microcomputer is all used to prepare answer data.

Finally, the answer data is returned from 32 bit to 8 bit to cause a reversal value of the question data to correspond to the answer data.

Since the ATCU relay 4 is broken, the power of the communication I/F circuit 10 connected to the downstream of the relay is broken, and communication with the ELOP 2 is lost. That is, changes occur in communication data.

Since the ELOP 2 has previously received the breaker circuit diagnosis request, the ELOP 2 determines that the breaker circuit diagnosis is in progress in the current phase and detects communication loss from the ATCU 1 (S218).

At this time, the ATCU 1 obtains voltage supplied from the power supply 5 via the IGN relay 3 and the ATCU relay 4. In a case in which the ATCU 1 determines that the voltage reaches an OFF threshold value of the IGNSW 6, transition to a self shut delay process in which the ATCU 1 is operated by voltage supplied from the power supply 5 not via the IGN relay 3 or the ATCU relay 4 is carried out (S219). In a case in which, although the false answer has been transmitted in S214, a state in which the voltage is not lowered to the OFF threshold value of the IGNSW 6 continues for a preset period of time, it is determined that the ATCU relay 4 is fixed to the ON state (S220), and trans on to the fail-safe state is carried out (S221).

Meanwhile, the fail-safe control in this step is to take control so that transition to a standby state and a reprogramming wait state may be carried out by the microcomputer 8 itself, and so that no operations may be performed until the IGNSW 6 is turned OFF.

In a case in which the ELOP 2 has detected communication loss from the ATCU 1, it is determined that the breaker function of the ATCU relay 4 is normally operated, and the breaker circuit diagnosis is regarded as being normal (S222).

In a case in which the ELOP 2 regards the breaker circuit diagnosis as being normal, the ELOP 2 turns ON the ATCU relay 4 again. (S223), reactivates the ATCU 1, and moves to normal control (S224). In this manner, by making, the diagnosis of the power supply breaker circuit by means of the ELOP 2 during the self shut-off delay process of the ATCU 1, the ATCU relay 4 is turned ON again during the self shut-off delay process, and the ATCU 1 can thus move to normal control before the microcomputer 8 completely stops. Accordingly, the diagnosis of the power supply breaker circuit by means of the ELOP 2 can be made without completely stopping the microcomputer 8 of the ATCU 1.

In a case in which the ELOP 2 cannot detect communication loss from the ATCU 1, the ELOP 2 determines that the ATCU relay 1 is fixed to the ON state and regards the breaker circuit diagnosis as being abnormal (S225).

In the case in which the ELOP 2 regards the breaker circuit diagnosis as being abnormal, the ELOP 2 transmits abnormality information to the ATCU 1 (S226), and the ATCU 1 moves to the fail-safe state.

Meanwhile, the fail-safe control in this step is to take control so that transition to a standby state and a reprogramming wait state may be carried out by the microcomputer 8 itself, and so that no operations may be performed until the IGNSW 6 is turned OFF.

Figure 6:
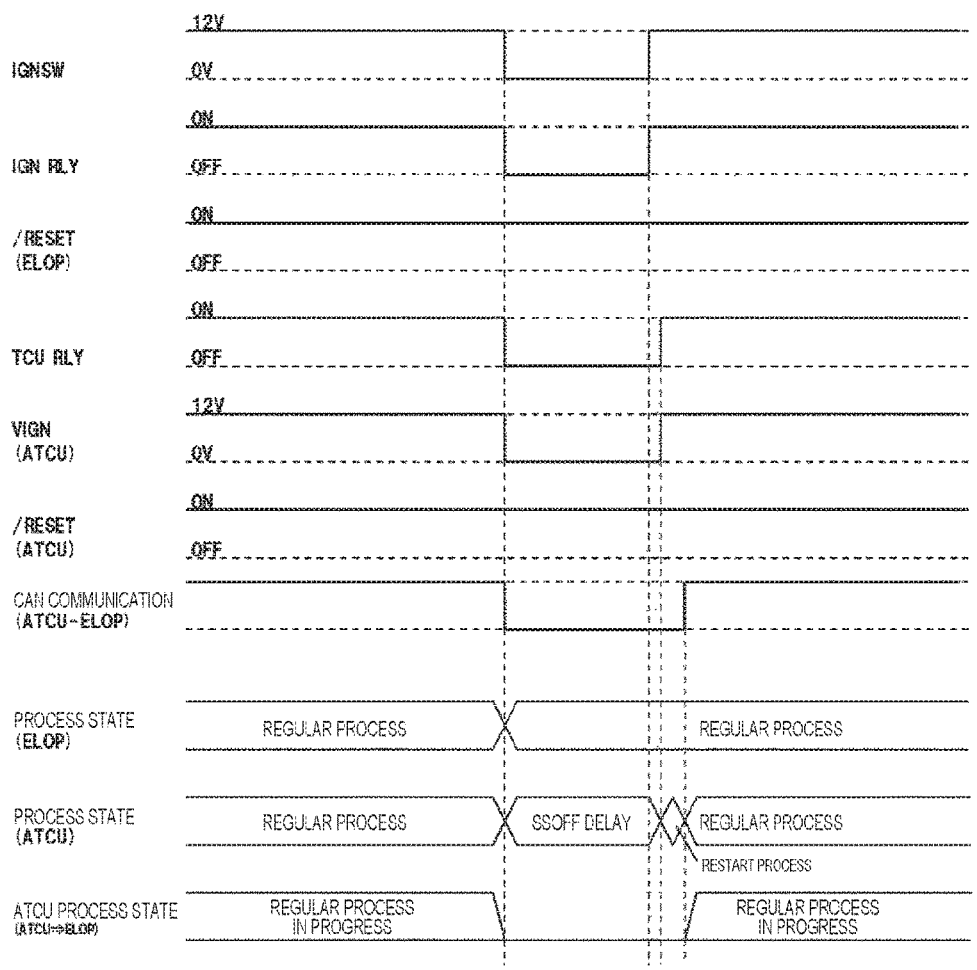
FIG. 6 is a timing chart of the power supply breaker circuit diagnosis at the time of recovery during SSOFF delay.
Figure 7:
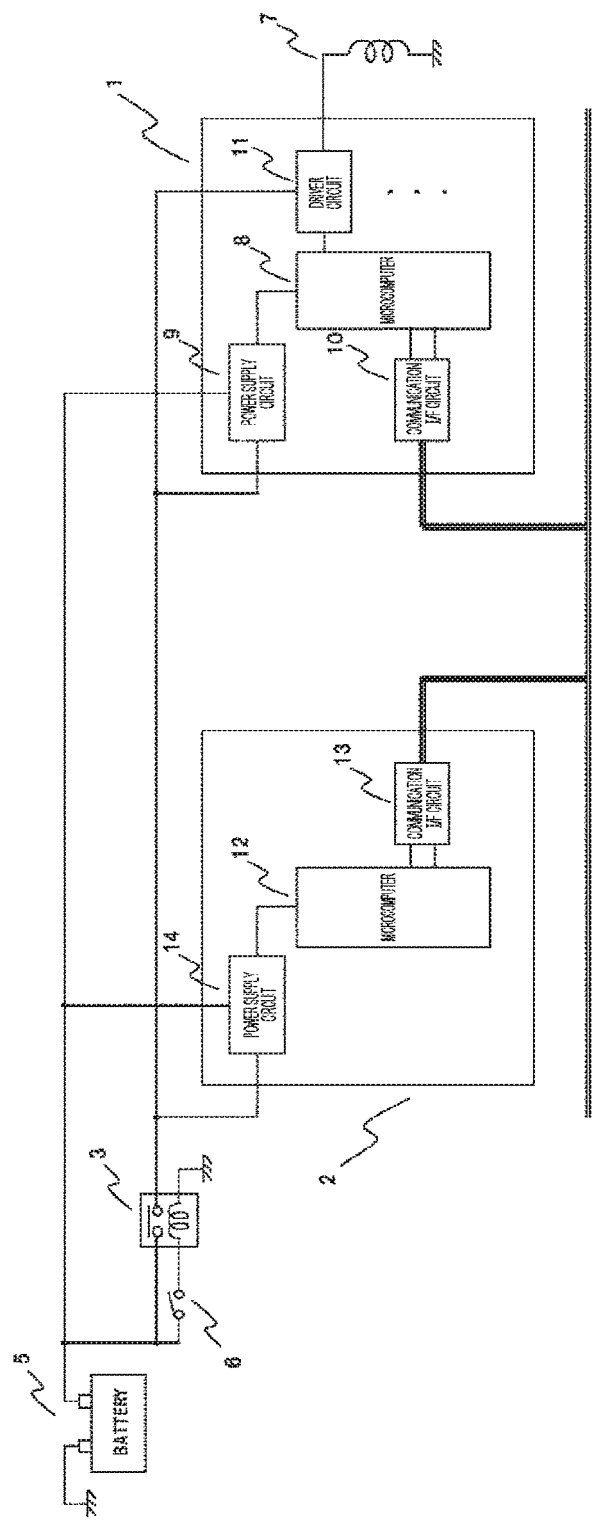
FIG. 7 is a system configuration diagram illustrating conventional ELOP-ATCU relationship.

FIG. 6 is a timing chart illustrating a process to deal with low voltage of the driving power supply after transition to normal control (regular process) after the breaker circuit diagnosis.

When the IGN RLY is turned OFF due to chattering of the IGNSW and temporary drop of power supply voltage, the TCU RLY located on the downstream of the IGN RLY is almost simultaneously turned OFF.

Since IGNSW voltage of the ATCU (VIGN) then goes down to 0 V, the ATCU moves to the self shut-off delay process.

In a case in which, in this system, resistance of the ELOP to power supply voltage is designed to be high, the normal process (regular process) of the ELOP continues, and only the process of the ATCU stops.

At this time, when the chattering of the IGNSW and the state of the power supply voltage are recovered during the self shut-off delay period, the ATCU is restarted and can return to the regular process without making a self-diagnosis process (initialization process).

With the above configuration, even when chattering of the IGNSW and temporary drop of power supply voltage occur while the vehicle is traveling, a period in which the ATCU system stops can be designed to be minimum.

As described in the above embodiments, the monitor system for monitoring an electronic control device according to the present invention includes monitor device physically independent for detecting an abnormality of an electronic control device to be monitored, a power supply means for supplying the electronic control device and the monitor device with driving power, a power supply means for supplying the monitor device with driving power in a case in which an activation switch signal to be input from outside is in an active level, a first relay provided between the power supply means and the monitor device for supplying/breaking power to the monitor device, a second relay provided on the downstream of the first relay for supplying/breaking driving power to the electronic control device based on determination of the monitor device regarding whether or not the driving power is to be supplied to the electronic control device, and a communication line for making a diagnosis by means of communication between the electronic control device and the monitor device.

Also, the electronic control device to be monitored may include a power supply circuit for outputting voltage to operate a microcomputer in a case in which the second relay is in an ON state due to an activation request from the monitor device, the microcomputer operated by voltage output from the power supply circuit, a communication circuit activated by an activation request signal from the monitor device, and a driver circuit for a solenoid valve activated by an activation request signal from the monitor device.

Also, the monitor device may at least include a power supply circuit for outputting voltage to operate a microcomputer of the monitor device in a case in which the activation switch signal is in the active level, the microcomputer operated by voltage output from the power supply circuit, and a communication circuit activated by power supplied from the power supply circuit.

Also, the monitor device may operate the microcomputer of the monitor device in a case in which the activation switch signal is in the active level and make a self-diagnosis of the microcomputer at the time of activation and a regular process, and in a case in which the monitor device confirms that the microcomputer is normally operated, the monitor device may turn ON the second relay.

Also, the monitor device may operate the microcomputer of the monitor device in a case in which the activation switch signal is in the active level and make a self-diagnosis or the microcomputer at the time of activation and a regular process, and in a case in which the monitor device confirms that the microcomputer is abnormal, the monitor device may transmit abnormality information to the control device to be monitored via the communication circuit and turn OFF the second relay.

Also, the electronic control device to be monitored may operate the microcomputer in a case in which the second relay is turned ON by an activation request from the monitor device and make a self-diagnosis of the microcomputer at the time of activation, and in a case in which the electronic control device determines that the microcomputer is abnormal, transition to a standby state may be carried out not to perform control of a vehicular automatic transmission or the like (e.g., oil pressure control of the solenoid valve).

Also, the electronic control device to be monitored operates the microcomputer in a case in which the second relay is in the ON state and performs control of the vehicular automatic transmission or the like (e.g., oil pressure control of the solenoid valve) at the time of a regular process. However, the electronic control device may make a self-diagnosis of the microcomputer even at the time of the regular process, and in a case in which the electronic control device determines that the microcomputer is abnormal, the electronic control device may transmit abnormality information to the monitor device via the communication circuit, stop output to the communication circuit, and then cause the microcomputer to move to a standby state not to perform control of the vehicular automatic transmission or the like.

Also, the monitor device may transmit question data for diagnosing an operating function in the microcomputer to the electronic control device to be monitored via the communication circuit at the time of the regular process.

Also, the electronic control device to be monitored may receive the question data transmitted from the monitor device and prepare answer data by executing a program previously incorporated in the microcomputer at the time of the regular process.

Also, the electronic control device to be monitored may transmit the answer data to the monitor device via the communication circuit at the time of the regular process.

Also, the monitor device may receive the answer data from the electronic control device to be monitored and determine based on the answer data whether or not the operating function in the microcomputer of the electronic control device to be monitored is normal.

Also, the monitor device may cause the second relay to be turned OFF in a case in which the monitor device determines that the diagnosis result is abnormal.

Also, the electronic control device to be monitored may have a configuration in which, in a case in which the second relay is caused to be turned OFF, the electronic control device can break electric connection to the communication circuit and the driver circuit for the solenoid valve before power to be supplied to the microcomputer is broken.

According to the present invention, by utilizing a network communication channel such as a CAN implemented on any of most recent electronic control devices as well as on the electronic control device for the vehicular automatic transmission (ATCU), another electronic control device can be regarded as a monitor device of the ATCU.

Also, a monitoring-side electronic control device transmits a question for diagnosing a function of a main microcomputer to an electronic control device to be monitored, and the electronic control device to be monitored calculates an answer to the question and transmits the answer to the monitoring-side electronic control device. In this manner, it is possible to detect a failure of the microcomputer in the electronic control device to be monitored.

Also, in a case in which the monitoring-side electronic control device detects an abnormality of the electronic control device to be monitored, the monitoring-side electronic control device can turn OFF the power supply relay of the electronic control device to be monitored to stop operations of the electronic control device to be monitored, that is, operations of the solenoid valve in a case of control of an automatic transmission. As a result, since the vehicle travels with the automatic transmission being in a direct gear state, it is possible to prevent enormous damage, such as an interlock caused by being unable to turn OFF the power supply relay due to runaway of the electronic control device to be monitored, from being generated.

Also, in a case in which the power supply relay of the electronic control device to be monitored is fixed to an ON state, the monitor device transmits failure information to the electronic control device to be monitored, and the electronic control device to be monitored can carry out a fail-safe process such as transition to a standby state by the electronic control device to be monitored itself.

Also, another electronic control device implemented on the vehicle acts as a monitor device to dispense with implementation of a monitor device on the electronic control device to be monitored itself, which is advantageous to system cost reduction.

INDUSTRIAL APPLICABILITY

According to the present invention, even in a case in which a breaker circuit diagnosis device cannot be implemented due to a hardware limitation such as an implementation area of an electronic control device, a breaker circuit diagnosis can easily be achieved by making an upper electronic control device control a power supply relay on condition that any communication means is provided. Also, the present invention can be applied to an electronic control device which, in a case of a functional abnormality of the electronic control device to be monitored, has a function of bringing a vehicle in a safe direction by making the upper electronic control device break (OFF) the power supply relay.

REFERENCE SIGNS LIST

1 ATCU
2 ELOP

4 ATCU relay
10 communication I/F circuit
13 communication I/F circuit
15 ATCU relay control circuit

The invention claimed is:

1. A system for monitoring a vehicular device, comprising:
   a vehicular automatic transmission;
   an electric oil pump operatively connected to the vehicular automatic transmission;
   an electronic controller configured to control the vehicular automatic transmission;
   an upper electronic controller configured to detect an abnormality of the vehicular automatic transmission;
   a first power supply configured to supply the vehicular automatic transmission and the upper electronic controller with a first power;
   a second power supply configured to supply only the upper electronic controller with a second power in a case in which an activation switch signal to be input into the system is at a given level;
   a first relay provided between the first power supply and the upper electronic controller, the first relay being configured to supply and to stop supply of the first power to the upper electronic controller,
   a second relay that is provided downstream of the first relay, the second relay being configured to supply and to stop supplying the first power to the vehicular automatic transmission based on a determination of the upper electronic controller in which the upper electronic controller determines whether or not the first power is to be supplied to the vehicular automatic transmission; and
   a communication line that is operatively coupled to the vehicular automatic transmission and to the electric oil pump, the communication line being configured to transmit a diagnosis of the vehicular automatic transmission and the upper electronic controller, wherein
   the upper electronic controller turns the second relay ON/OFF at a specific time and confirms a communication loss from the vehicular automatic transmission at the specific time to thereby detect a failure of the second relay.

* * * * *

UNITED STATES PATENT AND TRADEMARK OFFICE
CERTIFICATE OF CORRECTION

PATENT NO. : 10,221,944 B2
APPLICATION NO. : 15/319025
DATED : March 5, 2019
INVENTOR(S) : Satoru Okubo et al.

Page 1 of 1

It is certified that error appears in the above-identified patent and that said Letters Patent is hereby corrected as shown below:

On the Title Page

Item No. (86): PCT No.: Replace "PCT/JP2015/006643" with "PCT/JP2015/066433"

Signed and Sealed this
Twentieth Day of August, 2019

Andrei Iancu
*Director of the United States Patent and Trademark Office*